Oct. 16, 1945.   R. F. THORNTON   2,386,917
DRIVING AXLE CONSTRUCTION
Filed Feb. 6, 1943   2 Sheets-Sheet 1

INVENTOR
Ray F. Thornton.
BY George and Smith
ATTORNEYS.

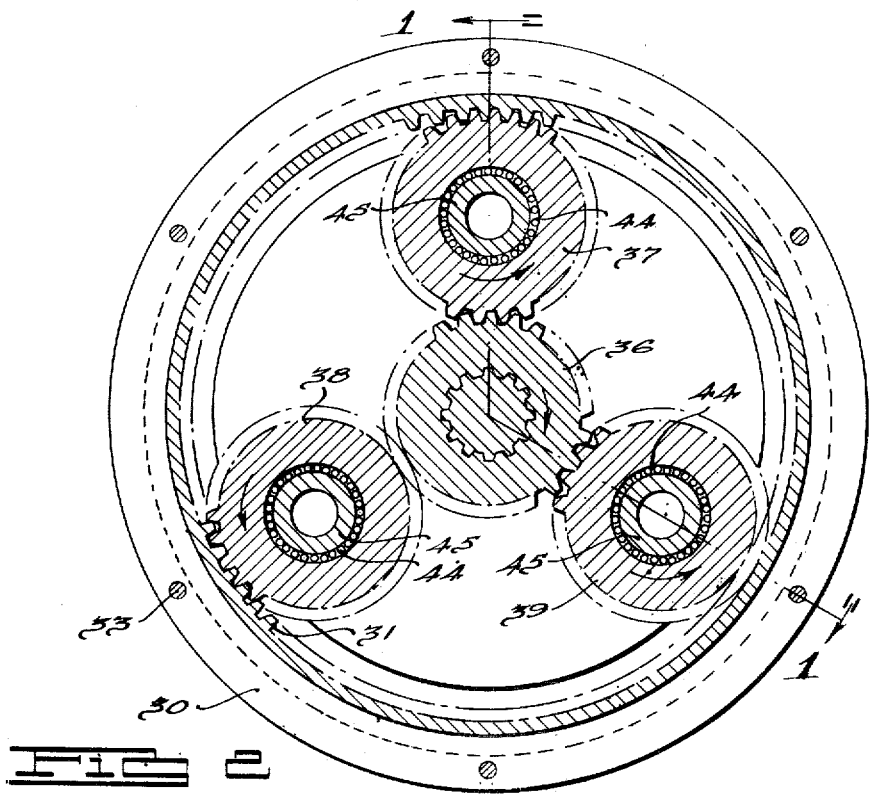
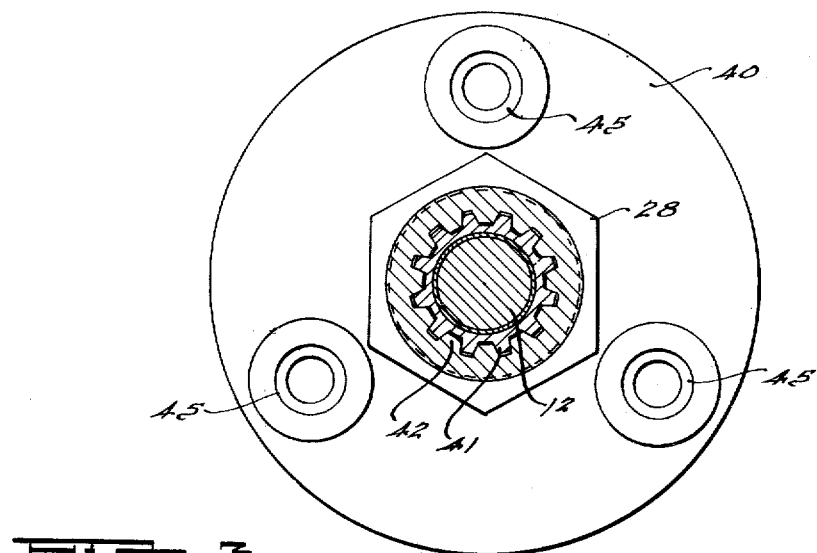

Patented Oct. 16, 1945

2,386,917

UNITED STATES PATENT OFFICE 2,386,917

DRIVING AXLE CONSTRUCTION

Ray F. Thornton, Dearborn, Mich.

Application February 6, 1943, Serial No. 474,933

13 Claims. (Cl. 74—391)

The present invention relates to a driving axle construction for a motor vehicle, and more particularly to novel features of design and construction which are associated particularly with the hub portion thereof.

The objects of the invention are:

First, to provide a driving axle of a novel and improved design and construction, which has a greater road clearance than conventional axles of a comparable capacity.

Second, to provide a novel driving axle in which the driving torque is uniformly distributed over a greater gear tooth-surface than is the case with conventional axles of comparable capacity, thus providing a serviceable construction which is rugged even under conditions of extreme abuse in service.

Third, to provide a novel driving axle construction in which the axle shaft is protected from excess breakage due to torsional strain and is self-aligning in operation to compensate for load-imposed deflections.

Fourth, to provide a novel driving axle construction in which the load carrying capacity of an axle shaft of a given diameter is substantially increased with safety over its rated load-carrying capacity when used in an axle of conventional design and construction.

Fifth, to provide a novel driving axle construction which may be readily and economically manufactured on a production basis, and which is designed for ready assembly and disassembly, to facilitate its construction as well as its maintenance and repair while in service.

Other objects of this invention will appear in the following description and appended claims, reference being had to the accompanying drawings forming a part of this specification wherein like reference characters designate corresponding parts in the several views.

In the drawings:

Fig. 2 is a sectional view taken substantially on the lines 2—2 of Fig. 1 looking in the direction of the arrows.

Fig. 3 is a sectional view taken substantially on the lines 3—3 of Fig. 1 looking in the direction of the arrows.

Figure 1:
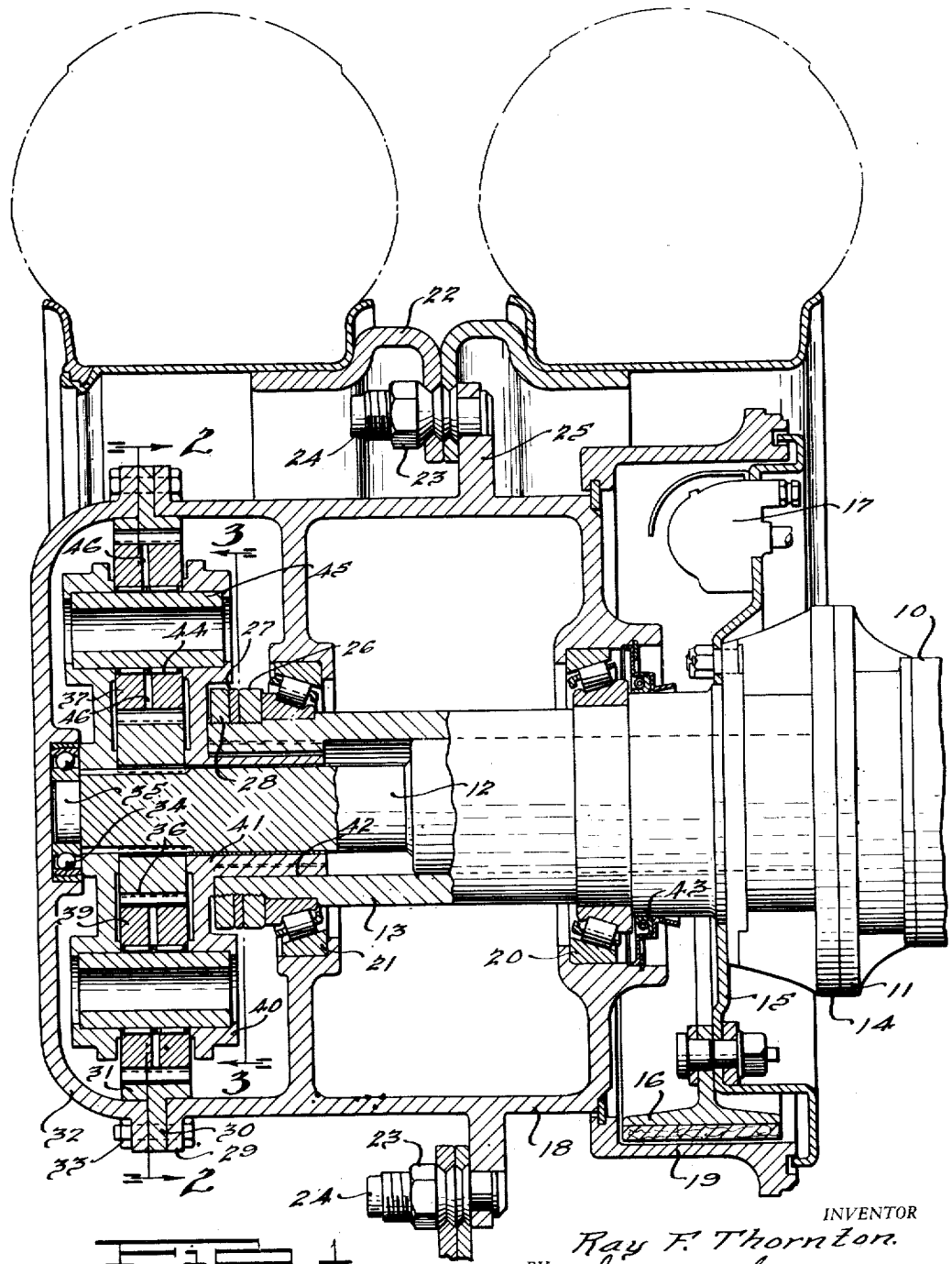
Fig. 1 is a fragmentary elevation of a hub portion of an axle embodying the present invention, which is taken substantially on the lines 1—1 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The novel structure and performance of an axle embodying the present invention is made possible by the novel hub-drive construction which is illustrated in detail in the said drawings. It is to be understood, however, that other features of the axle construction are also provided, but since these may be of conventional design, I have for the purposes of the present application elected to illustrate chiefly the hub-drive construction since the other portions of the driving axle construction are well known to those skilled in the art. It is to be understood, however, that the driving axle of the present invention will include at least two driving hubs, one on either end of the axle, a suitable gearing, such for example as a ring gear and pinion for transmitting driving torque from a drive shaft to the axle shaft, and a differential interposed between such gearing and the axle shafts. In so far as any such parts are not here particularly shown and described, it is to be understood that they may be of any desired and suitable conventional design.

Referring to the drawings, the axle construction of the present invention comprises a tubular axle-housing 10 which terminates at each end in a parting flange 11. The axle drive shaft 12 is suitably journaled in the housing 10 and extends through an axle hub sleeve 13, which has flanges 14 which are detachably secured to the flange 11, thus forming in effect a continuation of the housing 10. It is to be understood that the housing 10 extends to and surrounds the differential (not shown), which in turn connects with the gear train for transmitting power from a power drive shaft (not shown) to the axle drive shaft 12.

A brake supporting plate 15 is secured to the axle hub sleeve 13 adjacent the flange 14, and carries brake shoes 16, and the brake operating mechanism 17, which may be of any suitable conventional construction, such for example as the hydraulic brake actuating cylinder here shown.

A wheel supporting hub 18, having a hollow interior, carries a brake drum 19, and is mounted on adjustable bearings 20 and 21, to permit its rotation relative to the axle hub sleeve 13. A wheel 22 of any desired conventional type is demountably attached by wheel mounting nuts 23, which engage the wheel carrying studs 24, anchored in the annular flange 25 which is formed integrally with the wheel supporting hub 18. As shown in the drawings, the wheel 22 is provided with a dual rim which carries the tires as shown in the dotted line portion of this figure.

The hub 18 is adjusted for rotation on the bearings 20 and 21 by the bearing adjusting nut 26, which is screw-threaded on the end of the sleeve 13, and held in adjusted position by the washer 27 and the lock nut 28.

The wheel supporting hub 18 terminates in a flange 29, adjacent which is secured a ring-gear 30, having internal cut teeth 31, disposed inside the hub 18 and extending toward the axle shaft 12. A hub-cap 32 is secured by a plurality of bolts and nuts 33 to the flange 29. A floating bearing 34 is carried by the hub-cap 32 and provides a floating bearing support for the end 35 of the axle shaft 12, which permits self-alignment of the axle shaft 12 to compensate for distortions due to load conditions or the like.

Driving torque is transmitted through a gear train from the driving axle 12 to the hub 18, and through the hub 18 to the road contacting tires carried by the wheel 22. The gear train comprises a spur gear 36 secured to the end of the axle shaft 12, which is in mesh with the three spur gears 37, 38 and 39 (see Fig. 2). The spur gears 37, 38 and 39 also are in mesh with the teeth 31 of the ring-gear 30. A stationary gear carrier 40 carries the spur gears 37, 38 and 39 and as shown in Figs. 1 and 3, is mounted in and extends outwardly from the end of the axle hub sleeve 13. The carrier 40 is preferably provided with a male-splined hub portion 41 which is engaged in a female-splined recess 42 in the end of the axle hub sleeve 13. Thus the carrier 40 and the gears mounted thereon is readily removable as a unit from the assembly.

The entire hub, gearing and bearings are lubricated by filling the chamber inside the hub 18 and the cap 32 with a suitable lubricant which is prevented from flowing out of the chamber by the bearing oil seal 43, which may be of any desired construction.

The spur gears 37, 38 and 39 are each mounted on bearings of the needle roller type 44, which are carried on shafts 45, the ends of which are mounted in the gear carrier 40. By this construction the gears 37, 38 and 39 are allowed to rotate relative to the gear carrier 40, while the gear carrier 40 is held against rotation with the axle by its above described engagement with the axle housing. The entire gear train thus acts as a transfer gearing to transmit driving torque from the axle shaft 12 to the hub 18. The driving ratio may be varied as desired by changing the ratio and sizes of the gears used.

To insure lubrication of the bearings 44, each of the spur gears 37, 38 and 39 is drilled or rifled or otherwise formed to provide a plurality of small radial holes or passages which act as lubricant ducts 46, through which lubricant is forced into the hubs of the gears by the meshed rotation of the gears during the operation of the axle.

The operation of the improved driving axle construction of the present invention is as follows:

To cause the vehicle to move forward, the axle driving shaft 12 and the attached gear 36 is rotated in a clockwise direction. This is reverse to the direction of rotation of a conventional axle construction in which the direction of rotation to cause the vehicle to move in a forward direction is counter-clockwise. This change in direction of rotation of the driving axle 12 is effected by the provision of suitable reverse drive gearing in the driving ring gear and pinion which is not here shown. The rotation of the spur gear 36 is transmitted to each of the meshing spur gears 37, 38 and 39 and causes these gears to rotate in a counter-clockwise direction around the shafts 45. The rotation of the gears 37, 38 and 39 drives the ring gear 30 in a counter-clockwise direction and thus the hub and the attached wheel are rotated in the counter-clockwise direction required to drive the vehicle in a forward direction.

The respective directions of rotation for the various gears are shown by the directional arrows which have been placed on the various gears in Fig. 2.

From the foregoing it will be apparent that the driving axle construction herein shown and described is of a novel and improved design and since provision may be made for any desired gear reduction in the hub itself, it is possible to use a smaller reduction gear construction in the differential portion of the axle as the present construction does not require that the complete reduction will be made therein as is the case with axles of conventional design and construction. Thus it is possible for example, to provide a two to one reduction in the ring gear and pinion, and to provide a further gear reduction in the hub gears used in the present axle construction. In this way the power transmitting characteristics of the axle may be changed by providing any desired gear ratios between the axle shaft and the hub. Since reduction is effected mainly through the gear train provided in the hub of the axle of the present invention, it is apparent that the size of the gears in the differential portion of the axle housing may be materially reduced. As is known, the road clearance of an axle is affected by the size of the differential gear housing. This in turn is controlled by the sizes of the gears to be placed in it. It is apparent therefore that the axle construction of the present invention may, while preserving the same gear ratios of a conventionally designed and constructed axle, accomplish the desired end by the use of smaller gears and a smaller differential gear housing. The present axle construction thus increases the road clearance of the axle over that of a conventional axle of like characteristics.

It will also be apparent from the foregoing that I have here shown and described a novel driving axle construction in which the driving torque is uniformly distributed over a greater gear tooth surface area than is the case with conventional axles of comparable capacity in which the entire driving torque is transmitted through the tooth-to-tooth contact between the ring gear and the pinion in which all of the gear reduction is accomplished. In the present construction there is not only the tooth-to-tooth contact between the ring gear and the pinion but there is also the tooth-to-tooth contact between the spur gear 36, the spur gears 37, 38 and 39 meshed therewith, and between the spur gears 37, 38 and 39 and the gear teeth of the ring gear 30, which is carried by the hub. This has been found to provide a very serviceable construction and since the gears in the hubs provide a favorable leverage as to the axle drive shafts, there is not the opportunity for breaking of the gear teeth and twisting of the axle drive shaft 12 as there is in a conventional type of axle in which the gear reduction has changed the driving torque before it is transmitted into the driving axle.

It will also be observed that in the present construction the axle shaft 12 is self-aligning in that the end 35 is journaled in a floating bearing 34 which is carried in the hub cap 32, thus when there is any deflection of the driving axle shaft 12 due to load conditions or the like, the end of the axle is allowed to float in the bearing 34 to the extent required to permit the said shaft to rotate about a true center. This, together with the favorable leverages permitted by the present unique construction protects the axle shafts from excess breakage due to torsional strains imposed thereon.

It is also to be observed that the present construction provides an increase in the load carrying capacity of an axle shaft of a given diameter, for the shaft is relieved of much of the high torsional loads which it is required to carry in conventional designs. In the event of a slight deflection of the shaft it is, as above pointed out, permitted by the present construction to rotate upon its own center and thus the torsional strains which frequently cause the breaking of shafts are minimized.

The design of the axle is such that it may be readily and economically manufactured in mass production, and it will be seen that it is capable of ready assembly and disassembly, particularly for maintenance, service and repair work. To disassemble the axle, it is only necessary to remove the hub cap 32 and disengage the ring gear 30 after which it will be seen that the gear carrier 40 and the attached gears 37, 38 and 39 may be pulled outwardly and away from the axle housing and hub thus leaving the axle driving shaft 20 and the connected spur gear 36 free to be pulled outwardly and away from the whole axle assembly. It will be seen therefore that all the working parts of the axle are easily accessible for inspection, service, maintenance or repair.

The adjustable bearings 20 and 21 permit the centering of the hub 18 on the housing sleeve 13, and the provision of the inclined bearing races effects adjustment of both bearings by a single adjusting nut 26.

I claim:

1. In a driving axle construction, a housing, a wheel supporting hub and removable hub cap rotatably mounted on said housing a power driven axle drive shaft journalled in said housing and having its free end journalled in a floating self-aligning bearing mounted on said hub cap in position to support the free end of the said axle drive shaft for rotation about its true axis, and a gear drive interposed between the said axle drive shaft and said hub.

2. A driving axle construction as claimed in claim 1 and further characterized in that the said gear drive comprises a central spur gear adjacent the end of each axle drive shaft meshed with a plurality of spur gears mounted in a stationary carrier and meshed with an internally toothed ring gear carried by said hub.

3. An axle construction as claimed in claim 1 and further characterized in that the gear drive comprises a spur gear driven by the axle shaft, a plurality of spur gears meshed therewith and mounted for rotation in a gear carrier which is anchored to said housing, and an internally toothed ring gear anchored to said hub meshed with said plurality of spur gears.

4. An axle construction as set forth in claim 1 and further characterized in that the gear drive comprises a gear train consisting of a spur gear secured adjacent the end of each axle shaft, a plurality of spur gears meshed therewith and mounted for rotation in a gear carrier which is splined in the end of said housing and secured against rotation with said shaft, and an internally toothed ring gear meshed with said plurality of spur gears and anchored to said hub.

5. In a driving axle construction a housing terminating in a parting flange at each end, a flanged hub supporting sleeve secured thereto, a hub journaled on said sleeve, an axle supporting bearing carried by said hub, a power driven axle drive shaft journaled in said housing and having an end extending through said hub supporting sleeve, and journaled in said axle supporting bearing and a gear train connecting said axle shaft and said hub in driving relation.

6. A driving axle construction as claimed in claim 5 and further characterized in that a hub cover is secured to said hub and carries a floating bearing in which an end of the axle shaft is journaled.

7. A driving axle construction as claimed in claim 5 and further characterized in that the gear train comprises a spur gear carried by the driving axle shaft, a plurality of spur gears meshed therewith, and an internally toothed ring gear secured to said hub and meshed with said plurality of spur gears, and a stationary gear carrier in which the said plurality of gears are rotatably mounted to transmit rotary motion from said spur gear on said axle shaft to said ring gear for effecting rotation of said hub.

8. A driving axle construction as claimed in claim 5 and further characterized in that the gear train comprises a spur gear carried by the driving axle shaft, a plurality of spur gears meshed therewith, and an internally toothed ring gear secured to the hub, and meshed with the said plurality of spur gears, and a stationary gear carrier in which the said plurality of spur gears are mounted for rotation, and means for lubricating said plurality of spur gears and comprising a plurality of radial lubricating ducts formed in each gear, and extending from the toothed portion to the hub thereof.

9. A driving axle construction as claimed in claim 5 and further characterized in that a hub cover is provided over the hub and a floating bearing is secured to said hub cover, to receive the end of the axle shaft and permit a floating journaling thereof, and said gear train comprises a spur gear carried by the driving axle, a plurality of spur gears meshed therewith, and an internally toothed ring gear secured to the hub and meshed with the said plurality of spur gears, said plurality of spur gears being mounted for rotation in a stationary gear carrier removably secured to an end of said housing.

10. A driving axle construction as claimed in claim 5 and further characterized in that the said hub is journaled on adjustable bearings carried by said sleeve.

11. A driving axle construction as claimed in claim 5 and further characterized in that the said hub is journaled on adjustable bearings carried by said sleeve and the end of the axle drive shaft is journaled in a floating bearing carried by a cover for said hub.

12. A driving axle construction as claimed in claim 5 and further characterized in that the said hub is journaled on adjustable bearings carried by said sleeve and the end of the axle drive shaft is journaled in a floating bearing carried by a cover for said hub, and in which a gear train for transmitting driving torque from the driving axle to the hub comprises a spur gear carried by the driving axle shaft, three equally spaced spur gears meshed therewith, and an internally toothed ring gear secured to the hub, and meshed with the said three equally spaced spur gears, and a stationary gear carrier in which the said three equally spaced spur gears are mounted for rotation, and means for lubricating said spur gears and comprising a plurality of radial lubricating ducts formed in each gear, and extending from the toothed portion to the hub thereof.

13. A driving axle construction as claimed in claim 6 and further characterized in that the said hub is journaled on adjustable bearings carried by said sleeve and the end of the axle drive shaft is journaled in a floating bearing carried by a cover for said hub, and in which a gear train for transmitting driving torque from the driving axle to the hub comprises a spur gear carried by the driving axle, a plurality of spur gears meshed therewith, and an internally toothed ring gear secured to the hub and meshed with the said plurality of spur gears, said plurality of spur gears being mounted for rotation in a stationary gear carrier removably secured to an end of said housing, and means for lubricating said gears comprising a lubricant filled chamber and a plurality of lubricating ducts formed in each of said plurality of spur gears and extending from the teeth to the hub portion thereof.

RAY F. THORNTON.

---

CERTIFICATE OF CORRECTION.

Patent No. 2,386,917.   October 16, 1945.

RAY F. THORNTON.

It is hereby certified that error appears in the printed specification of the above numbered patent requiring correction as follows: Page 3, first column, line 30, for "disassembe" read --disassembly--; line 70, claim 3, after the word "hub" insert --and--; and that the said Letters Patent should be read with this correction therein that the same may conform to the record of the case in the Patent Office.

Signed and sealed this 9th day of April, A. D. 1946.

Leslie Frazer (Seal)   First Assistant Commissioner of Patents.

ing axle to the hub comprises a spur gear carried by the driving axle shaft, three equally spaced spur gears meshed therewith, and an internally toothed ring gear secured to the hub, and meshed with the said three equally spaced spur gears, and a stationary gear carrier in which the said three equally spaced spur gears are mounted for rotation, and means for lubricating said spur gears and comprising a plurality of radial lubricating ducts formed in each gear, and extending from the toothed portion to the hub thereof.

13. A driving axle construction as claimed in claim 6 and further characterized in that the said hub is journaled on adjustable bearings carried by said sleeve and the end of the axle drive shaft is journaled in a floating bearing carried by a cover for said hub, and in which a gear train for transmitting driving torque from the driving axle to the hub comprises a spur gear carried by the driving axle, a plurality of spur gears meshed therewith, and an internally toothed ring gear secured to the hub and meshed with the said plurality of spur gears, said plurality of spur gears being mounted for rotation in a stationary gear carrier removably secured to an end of said housing, and means for lubricating said gears comprising a lubricant filled chamber and a plurality of lubricating ducts formed in each of said plurality of spur gears and extending from the teeth to the hub portion thereof.

RAY F. THORNTON.

CERTIFICATE OF CORRECTION.

Patent No. 2,386,917.   October 16, 1945.

RAY F. THORNTON.

It is hereby certified that error appears in the printed specification of the above numbered patent requiring correction as follows: Page 3, first column, line 30, for "disassembe" read --disassembly--; line 70, claim 3, after the word "hub" insert --and--; and that the said Letters Patent should be read with this correction therein that the same may conform to the record of the case in the Patent Office.

Signed and sealed this 9th day of April, A. D. 1946.

Leslie Frazer (Seal)   First Assistant Commissioner of Patents.